(12) United States Patent
Wang

(10) Patent No.: US 7,078,657 B2
(45) Date of Patent: Jul. 18, 2006

(54) ALL DISASSEMBLEABLE ELECTRIC-HEATING APPARATUS

(76) Inventor: Dong-lei Wang, No. 1 Jinfeng Road., Tangjiawan Town, Xiangzhou District, Zhuhai City, Guangdong Province (CN)

( * ) Notice: Subject to any disclaimer, the term of this patent is extended or adjusted under 35 U.S.C. 154(b) by 0 days.

(21) Appl. No.: 11/069,381

(22) Filed: Mar. 1, 2005

(65) Prior Publication Data

US 2005/0258163 A1    Nov. 24, 2005

(30) Foreign Application Priority Data

May 21, 2004    (CN) ................ 2004 2 00460011 U

(51) Int. Cl.
*H05B 1/02* (2006.01)

(52) U.S. Cl. ................ 219/517; 219/481; 219/505; 99/330

(58) Field of Classification Search ................ 219/494, 219/497, 505, 499, 501, 437, 506–511, 517, 219/481; 99/325–331

See application file for complete search history.

(56) References Cited

U.S. PATENT DOCUMENTS

| 4,320,285 | A | * | 3/1982 | Koether ................ 219/497 |
| 5,019,690 | A | * | 5/1991 | Knepler ................ 219/400 |
| 5,352,866 | A | * | 10/1994 | Cartwright et al. ......... 219/497 |
| 5,839,355 | A | * | 11/1998 | Faulkner ................ 99/330 |
| 2003/0047084 | A1 | * | 3/2003 | Shandross ................ 99/330 |
| 2005/0034611 | A1 | * | 2/2005 | McLemore ................ 99/413 |

* cited by examiner

Primary Examiner—Mark Paschall
(74) Attorney, Agent, or Firm—Colin P. Cahoon; Carstens & Cahoon, LLP

(57) ABSTRACT

The present invention discloses an all disassembleable electric-heating apparatus comprising a shell, a cover, a reservoir installed inside said shell, an electric heater installed inside said reservoir and immersed in the liquid contents of said reservoir in working mode, and control elements including a control box and thermo-elements; wherein, said thermo-elements include electrical elements, said electrical elements are peripherically electric-insulated and sealed, so as to be immersed in the liquid contents of said reservoir in working mode and be taken out for cleaning after use.

4 Claims, 10 Drawing Sheets

ALL DISASSEMBLEABLE ELECTRIC-HEATING APPARATUS

TECHNICAL FIELD

This invention relates to an electric-heating apparatus of which almost all parts can be disassembled and cleaned.

BACKGROUND OF THE INVENTION

Currently, there exists in the market a so-called all disassembleable electric-heating apparatus, of which almost all parts can be disassembled and cleaned conveniently by the users. For example, there is an all disassembleable electric fryer, including a metal shell, a top cover, an oil reservoir, a basket assembly and electrical elements; wherein, said electrical elements comprise a control box, an electric heater, a thermo-control for regulating the oil temperature and a thermo-limitation for limiting the maximum oil temperature; and wherein, all of the metal shell, the top cover, the reservoir, the basket assembly and control elements can be taken out for cleaning. Since the electric heater with electric-insulating coating needs to be submersed in the oil, in order to control the oil temperature accurately, the thermo-control and the thermo-limitation should also be immersed in the oil and secured with the electric heater, therefore, the thermo-control and the thermo-limitation should have excellent electric resistance. To satisfy the above requirements, the existing all disassembleable electric fryer uses mechanical elements, i.e., the capillary thermo-elements, for regulating the oil temperature. Although the capillary thermo-elements have good electric resistance, they have following short-comings: first, they are expensive, accounting for around 20% of the total production cost, which greatly affects the competitiveness of the products; secondly, the precision of the mechanical elements is poor, which causes considerable fluctuation of the oil temperature; thirdly, the capillary tube has very small radius and easy to be damaged when cleaning. The electrical thermo-elements, such as thermistors, fuses, etc., are capable of detecting and controlling the temperature, but due to the problem of non-electric insulation, they are not used in the all disassembleable electric-heating apparatus.

SUMMARY OF THE INVENTION

The main object of the present invention is to provide an all disassembleable electric-heating apparatus, using electrical thermo-elements in stead of expensive mechanical thermo-elements, which satisfies the requirements for electric insulation, lowers the production cost, improves the precision of temperature control, and is more convenient and reliable for the users.

According to the present invention, an all disassembleable electric-heating apparatus comprises:
  a shell;
  a cover;
  a reservoir installed inside said shell;
  an electric heater installed inside said reservoir and immersed in the liquid contents of said reservoir in working mode;
  control elements including a control box and thermo-elements; wherein, said thermo-elements include electrical elements, said electrical elements are peripherically electric-insulated and sealed, so as to be immersed in the liquid contents of said reservoir in working mode and be taken out for cleaning after use.

Said thermo-elements include thermo-controls for regulating the temperature and thermo-limitations for limiting the maximum temperature.

Said thermo-control may be a thermistor, said thermistor and the leads thereof are incased in a sealing tube.

With the thermistor secured inside the sealing tube, the thermistor can be used in an all disassembleable electric-heating apparatus instead of the capillary thermo-elements, having the same function, therefore, the production cost can be greatly reduced.

BRIEF DESCRIPTION OF THE DRAWINGS

FIG. 9b is a top view of the tube as shown in FIG. 9a;

DETAILED DESCRIPTION OF THE PREFERRED EMBODIMENTS

The present invention may apply to various all disassembleable electric-heating apparatus, e.g. an all disassembleable electric fryer, a coffee maker, a water heater, an electro-thermal producer, etc.

Figure 1:
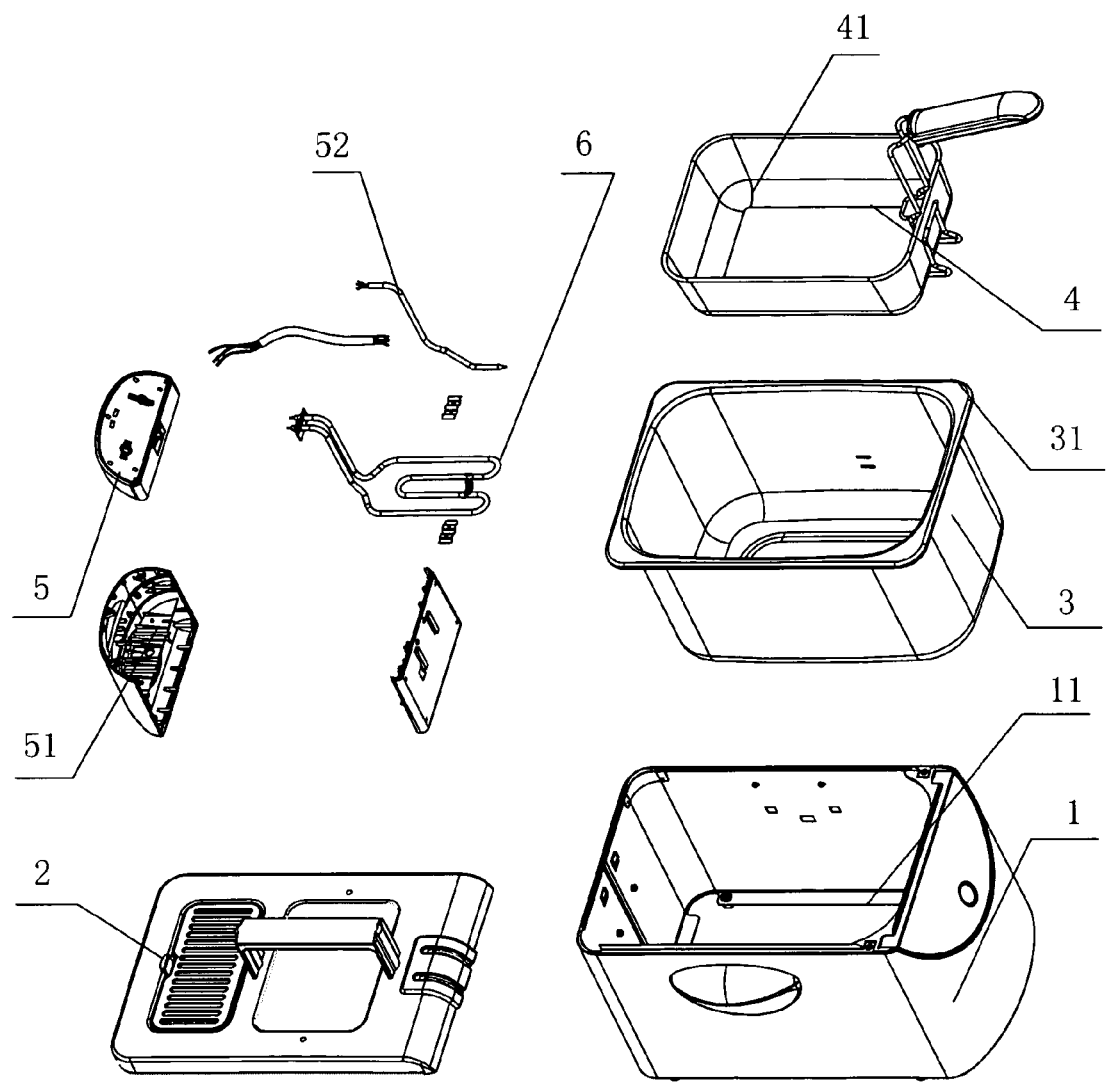
FIG. 1 is an explosive diagram of an all disassembleable electric fryer according to one embodiment of the present invention.

As shown in FIG. 1, the all disassembleable electric fryer includes a shell 1, a top cover 2, an oil reservoir 3, a basket assembly 4 and a control component 5. Said shell 1 has two handles, each located respectively at one of the two opposite sidewalls. The lower edge of all of the four sidewalls of the shell 1 is vertically inturned and forms a narrow rim 11, on which the whole electric fryer can stand stably. The reservoir 3 is held inside the shell 1, and the upper edge of the reservoir 3 is bordered with an outturned rim 31 for resting the reservoir 3 over the shell 1 and lifting it up. The control component 5 comprises a control box 51, an electric heater 6 and thermo-elements 52, said thermo-elements 52 further include a thermo-control for controlling the oil temperature and a thermo-limitation for limiting the maximum oil temperature. The electric heater 6 with insulating coatings is immersed in the oil in working mode, the leads of which are connected with the control box 51, while the thermo-elements 52 are also immersed in the oil and secured with the electric heater 6, the leads of which are also connected with the control box 51. The basket assembly 4 is equipped with a handle for securing and carrying the basket assembly 4. The basket 41 of the basket assembly 4 positioned over the electric heater 6 and the thermo-elements 52 is also submersible in the oil, accommodating the food being cooked. When said electric fryer is to be cleaned after use, the user may open the top cover 2, take out the basket assembly 4, the control component 5 and the reservoir 3 in turn. All elements, except the control box, can be washed with water.

Embodiment 1

Figure 2:
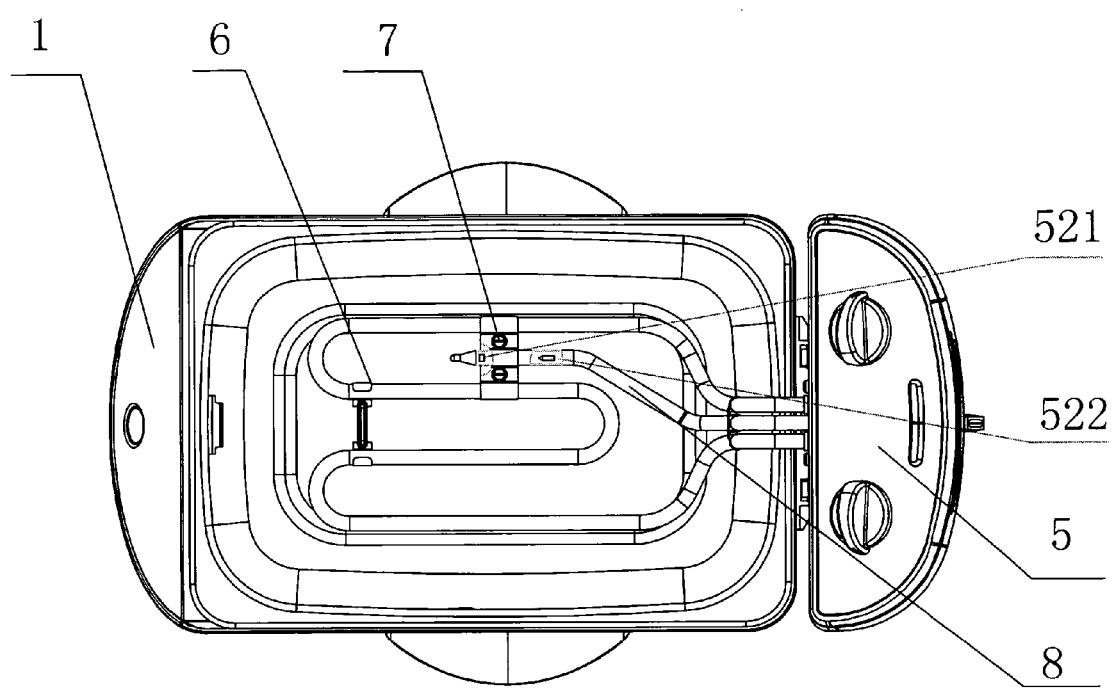
FIG. 2 shows the location of the thermo-control and the thermo-limitation according to embodiment 1 of the all disassembleable electric fryer as shown in FIG. 1.

As shown in FIG. 2, the invention is featured with the locations of the thermo-control and the thermo-limitation.

Figure 9A:
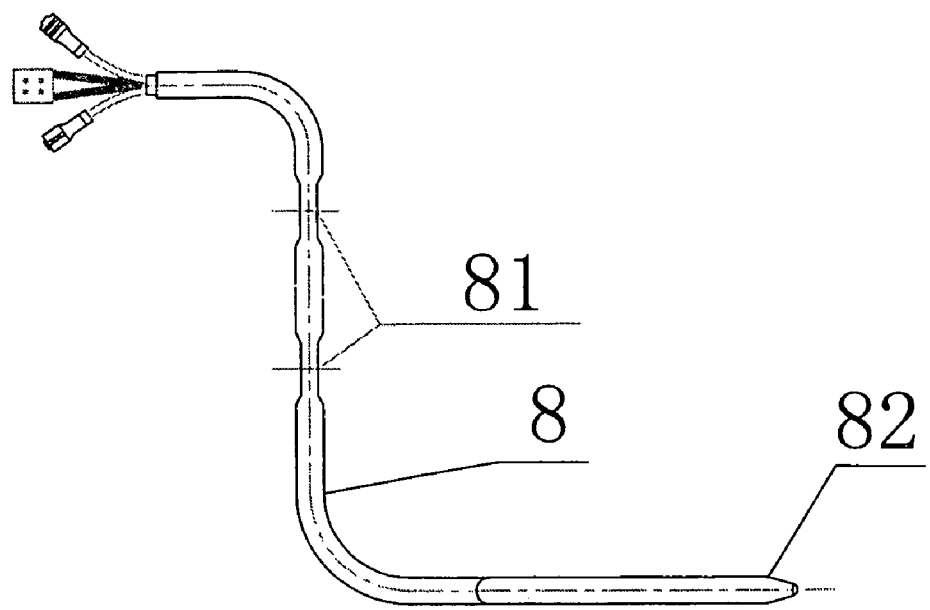
FIG. 9a is a front view of the tube accommodating the thermo-elements shown in FIG. 2.
Figure 9B:
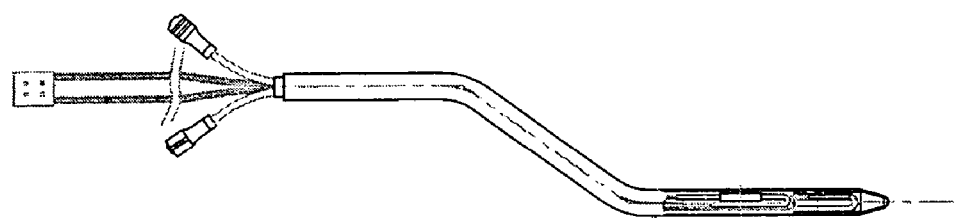
Figure 10:
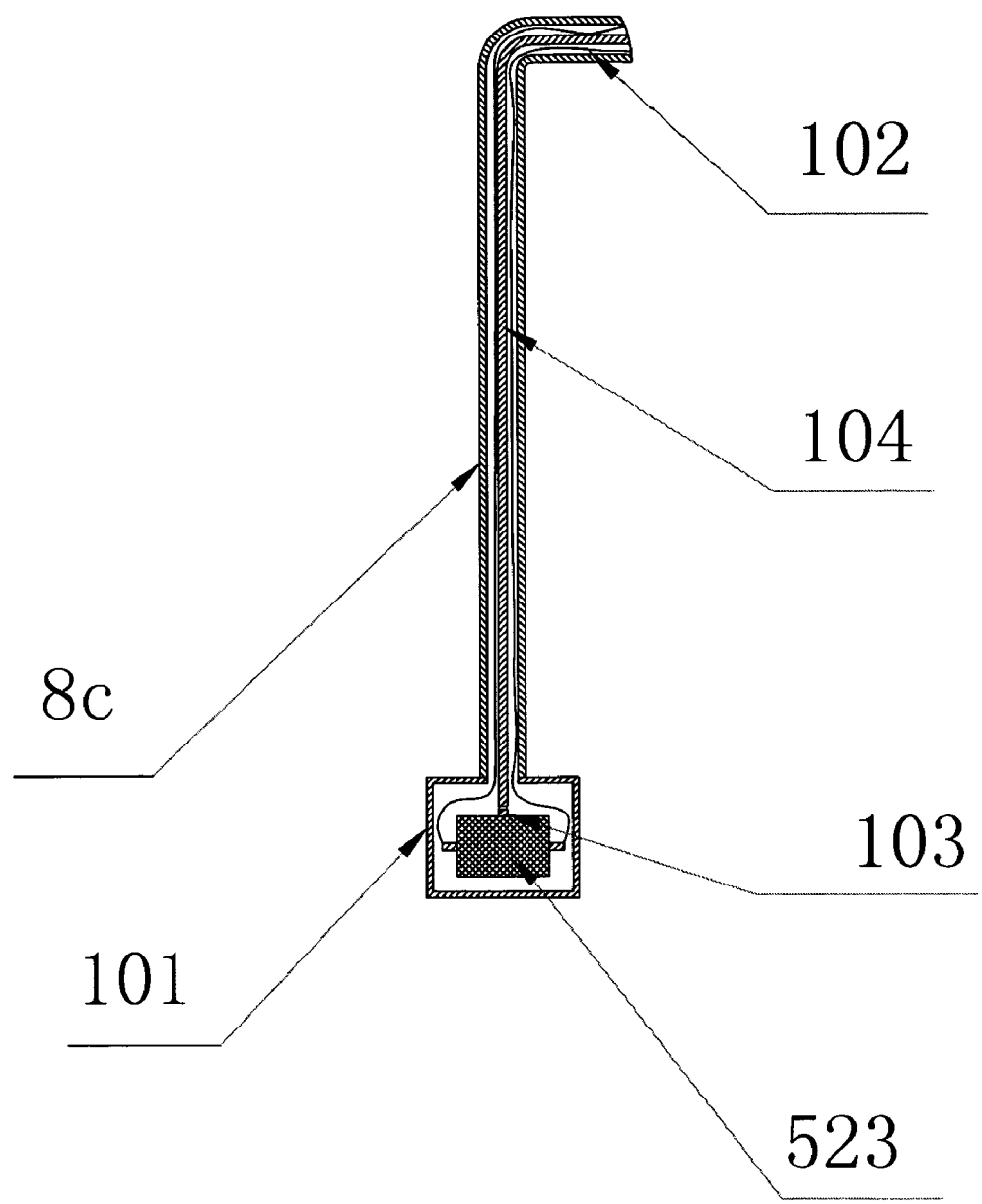
FIG. 10 is a schematic diagram of a restorable thermo-limitation.

In the present embodiment, the thermo-control uses a thermistor 521, the thermo-limitation uses a fuse 522, both of the thermistor 521 and the fuse 522 are incased in the same tube 8, which may be the same stainless steel tube as the housing tube of the electric heater 6. As shown in FIG. 9a, seen from the front, the tube 8 is of "⌐⌙" shape, the left upper end of which is connected to the control box 51, the right lower end of which is sealed, i.e., the outlet of the tube is first narrowed into conical shape, then the end of the conical tube is sealed by welding. In addition, the tube 8 is flatten somewhere along the tube so as to secure the leads inside the tube. As shown in FIG. 9b, seen from the top, the tube 8 is bent into "⌐⌙" shape. Actually, the shape of the tube 8 is determined according to the locations of the thermo-elements 52. In the present embodiment, the conical tube 82 of the tube 8 is positioned between the tubes of the electric heater 6, and is coplanar with the electric heater 6. The thermo-elements 52 are installed within the end part of the tube 8, which is secured by a frame 7 with the electric heater 6 immersed in the oil.

Figure 5:
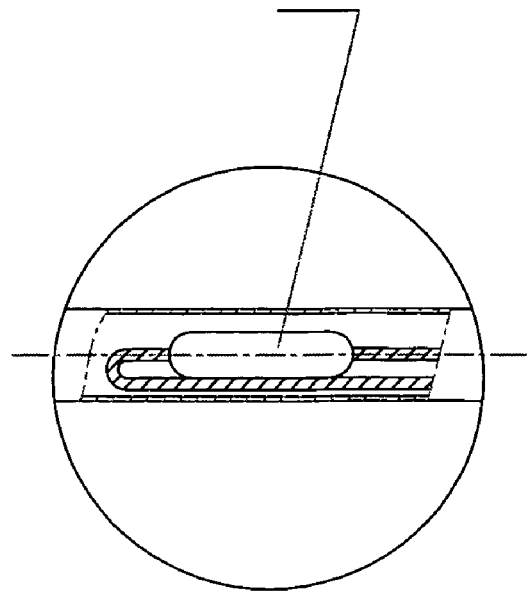
FIG. 5 is an enlarged view showing the intra-tube arrangement of the thermo-elements shown in FIG. 2.
Figure 6:
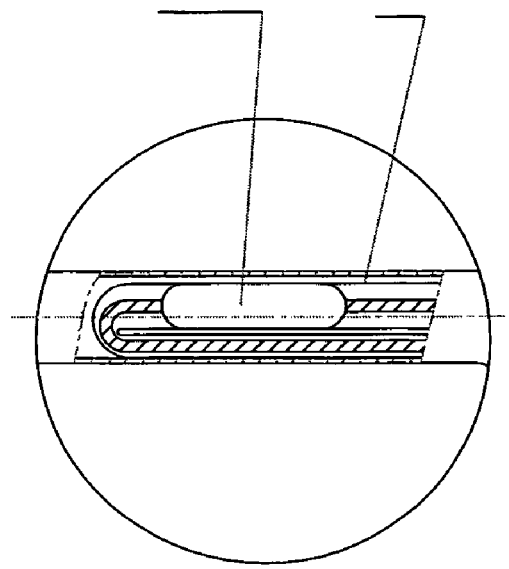
FIG. 6 is an enlarged view showing an alternative intra-tube arrangement of the thermo-elements shown in FIG. 2.

To ensure the electric insulation of the thermo-control and the thermo-limitation, the thermistor 521 and the fuse 522 can be arranged as shown in FIG. 5: there are insulating coatings at the peripheries of the thermistor 521, fuse 522 and the leads, and the thermistor 521 and the fuse 522 are secured inside the tube 8, either contacting or non-contacting the tube-walls. An alternative arrangement of the thermistor 521 and fuse 522 is shown as FIG. 6: the thermistor 521, the fuse 522 and the leads are first inserted into the fluoride resin tube 9, which is a heat and electric resistant tube, then the tube 9 enclosed with the thermistor 521 and the fuse 522 is installed inside the tube 8.

Figure 11:
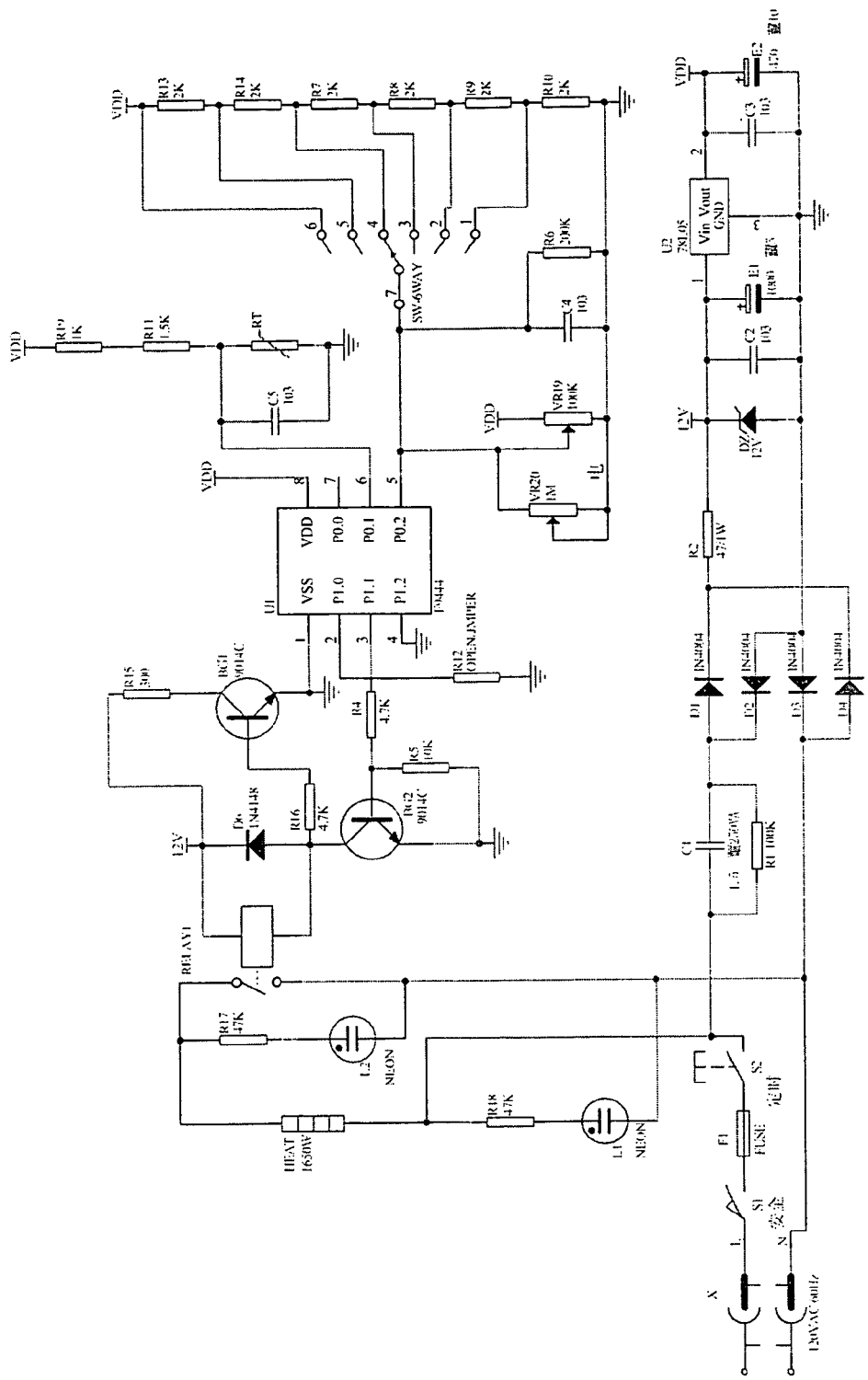
FIG. 11 is the electro-circuit diagram of the all disassembleable electric fryer as shown in FIG. 1.

As shown in FIG. 11, the electro-circuit of the present invention is the same as the prior art, except that the thermo-elements use the electrical elements instead of mechanical elements: the thermistor RT is used to detect the change of the oil temperature. The objective oil temperature is set by two alternative ways: one way is by changing the resistance of the variable resistor VR19; the other way is by switching the 6-way switch so as to select a different resistance R13, or R14, or R7, or R8, or R9, or R10. The single-chip U1 (e.g., F9444) compares the actual oil temperature detected by the thermistor RT with the objective oil temperature, then controls the RELAY 1 to be connected or disconnected, and to actuate the executor, electric heater (e.g., 1650W). If the actual oil temperature is equal to or greater than the objective oil temperature, the single-chip U1 controls the RELAY 1 to be disconnected, the electric heater then stops heating; if the actual oil temperature is less than the objective oil temperature, the single-chip U1 controls the RELAY 1 to be connected, the electric heater then starts heating.

When the reservoir 3 is dry-heating, since the thermistor 521 is secured near the electric heater 6, it will soon sense the heat, and the electro-circuit is disconnected. Thus, the fuse 522 will be protected from being disconnected in case of dry heating. However, when the thermo-control is in short circuit, the fuse will be disconnected due to the gradual increase of the temperature.

Embodiment 2

Figure 3:
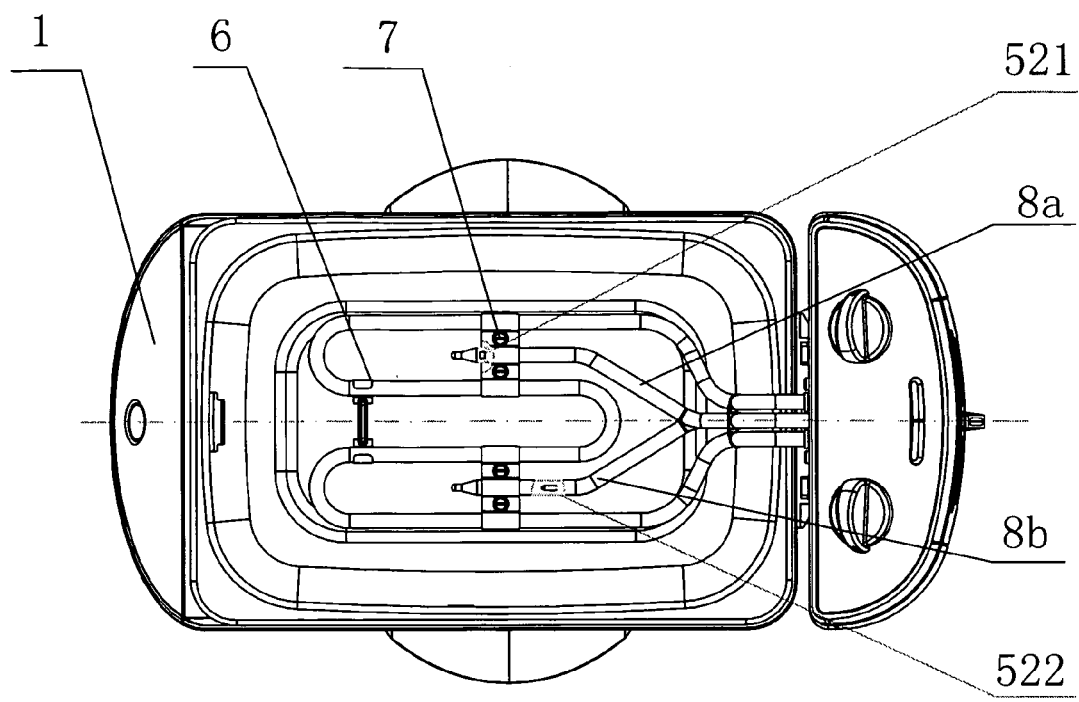
FIG. 3 shows the location of the thermo-control and the thermo-limitation according to embodiment 2 of the all disassembleable electric fryer as shown in FIG. 1.
Figure 4:
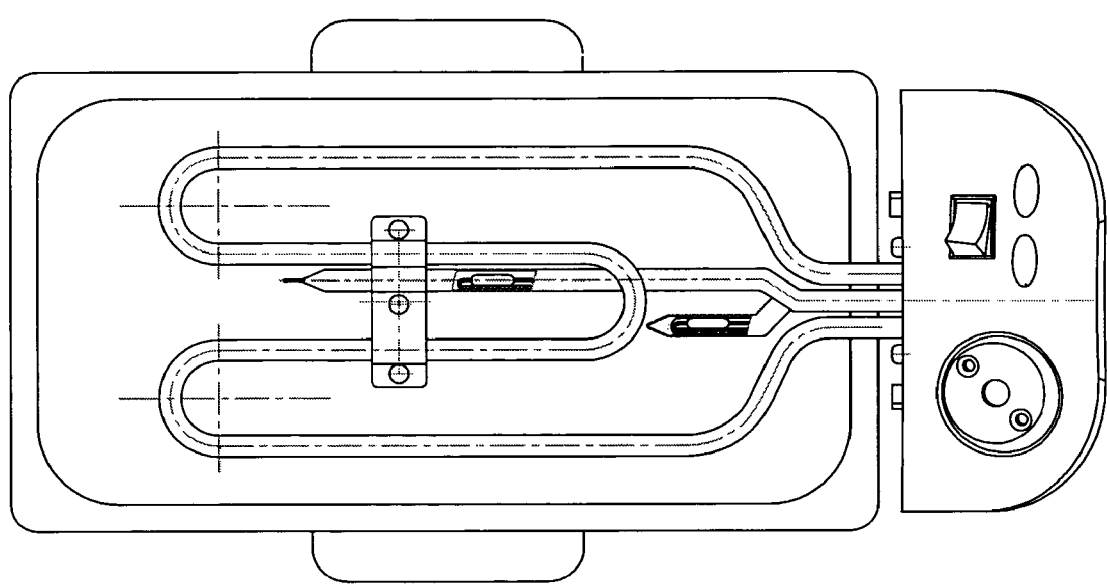
FIG. 4 shows alternative locations of the thermo-control and the thermo-limitation according to embodiment 2 of the all disassembleable electric fryer as shown in FIG. 1.

As shown in FIGS. 3 and 4, the difference of the present embodiment compared with embodiment 1 is: the thermistor 521 and the fuse 522 are installed respectively inside different tubes. The tube 8a enclosed with the thermistor 521 remains secured near the electric heater with a frame 7a, while the fuse 522 is secured inside another tube 8b. The other ends of the tube 8a and 8b are connected with the control box 51. The thermistor 521 and the fuse 522 can be installed at different locations, therefore, the bending shape of the tube 8a or 8b changes accordingly.

Embodiment 3

Figure 7:
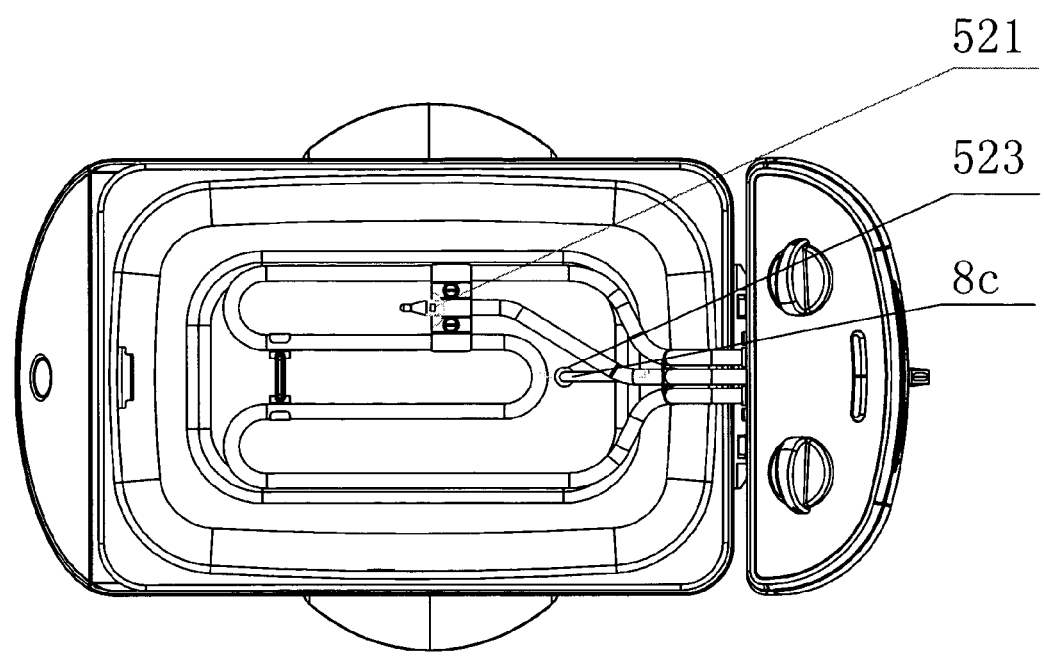
FIG. 7 shows the locations of the thermo-control and the thermo-limitation according to embodiment 3 of the all disassembleable electric fryer as shown in FIG. 1.
Figure 8:
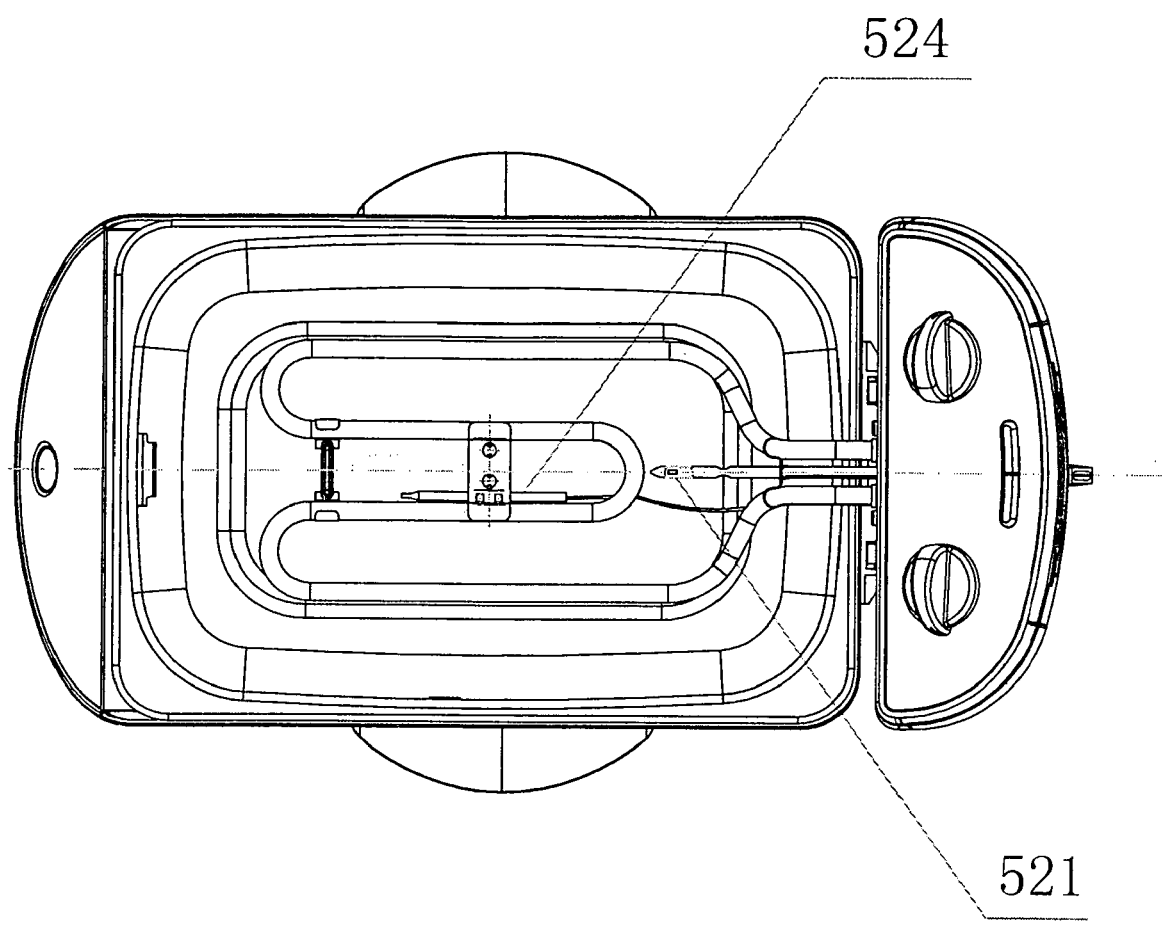
FIG. 8 shows the locations of the thermo-control and the thermo-limitation according to embodiment 4 of the all disassembleable electric fryer as shown in FIG. 1.

As shown in FIG. 7, the difference of the present embodiment compared with embodiment 2 is: a restorable thermo-control is used as the overheat protection element, e.g., the restorable disc-shaped thermo-control 523. The function of said restorable thermo-control is similar to a fuse, except that, this thermo-control can be restored manually.

Its structure is as follows: The restorable disc-shaped thermo-control 523 is coated with an insulating material and is incased in a shell 101, which is connected with the tube 8c, the other end of the tube 8c is connected with the control box 51. The two leads 102 of the restorable disc-shaped thermo-control 523 are connected with the internal elements of the control box 51 via the tube 8c. The restore switch 103 of the restorable disc-shaped thermo-control 523 faces the connection point of the shell 101 and the tube 8c, the lever 104 passes through the inner chamber of tube 8c, the end of the lever 104 is positioned above the restore switch 103, and the head of the lever 104 extends through the connection point of the tube 8c and the control box 51. The temperature regulation process of the thermistor 521 is the same as that in embodiment 1 and 2, except for the temperature limitation: when the restorable thermo-control 523 is actuated due to overheat of the oil temperature or error of the electro-circuit, by pressing the lever 104, the restore switch 103 can be restored, and thus the restorable disc-shaped thermo-control 523 is reset for continuous work.

Embodiment 4

In this embodiment, the mechanical capillary thermo-control 524 is used as the thermo-limitation as in the prior art, except that, the electrical element is used as the thermo-control. If a thermistor is used to control the oil temperature, the requirements for the location of the thermo-control is the same as those in embodiment 1, and the actual location can be adjust flexibly.

What is claimed is:

1. An all disassembleable electric-heating apparatus comprising:
   a shell;
   a cover;
   a reservoir installed inside said shell;
   an electric heater installed inside said reservoir and immersed in the liquid contents of said reservoir in working mode;
   control elements including a control box and thermo-elements, wherein said thermo-elements include electrical elements that are peripherally electric-insulated and sealed so as to be immersed in the liquid contents of said reservoir in working mode and taken out for cleaning after use;
   wherein said thermo-elements include thermo-controls for regulating the temperature and thermo-limitations for limiting the maximum temperature, wherein said thermo-limitation is a restorable thermo-limitation; and
   wherein, said restorable thermo-limitation is a restorable disc-shaped thermo-control, said restorable disc-shaped thermo-control is coated with an insulating material and is incased in a shell, which is connected with a sealing tube; a restore switch of the restorable disc-shaped thermo-control faces the connection point of the shell and the sealing tube, a lever having an end and a head passes through an inner chamber of the tube, the end of the lever is positioned above the restore switch, and the head of the lever extends through the connection point between the sealing tube and the control box, and the restore switch can be restored by pressing the lever.

2. An all disassembleable electric fryer comprising:
   a shell;
   a top cover;
   a wire basket and an oil reservoir installed inside said shell;
   an electric heater installed inside said reservoir and immersed in the oil of said reservoir in working mode;
   control elements including a control box and thermo-elements; wherein, said thermo-elements include electrical elements, said electrical elements are peripherally electric-insulated and sealed, so as to be immersed in the oil of said reservoir in working mode and be taken out for cleaning after use; and
   wherein said thermo-elements include a thermistor for regulating the temperature and a fuse for limiting the maximum temperature, wherein said thermistor and said fuse, and the leads thereof, are incased together in a sealing tube that is immersed in the oil of said reservoir in working mode.

3. An all disassembleable electric fryer according to claim 2, wherein said thermistor and said fuse, and the leads thereof, are first inserted into a heat and electric resistant tube, where the heat and electric resistant tube is then installed inside the said sealing tube.

4. An all disassembleable electric fryer according to claim 3, wherein said heat and electric resistant tube is a fluoride resin tube.

* * * * *